March 1, 1960  K. UNDESSER  2,927,318
RADAR SYSTEM
Filed Dec. 3, 1956  4 Sheets-Sheet 2

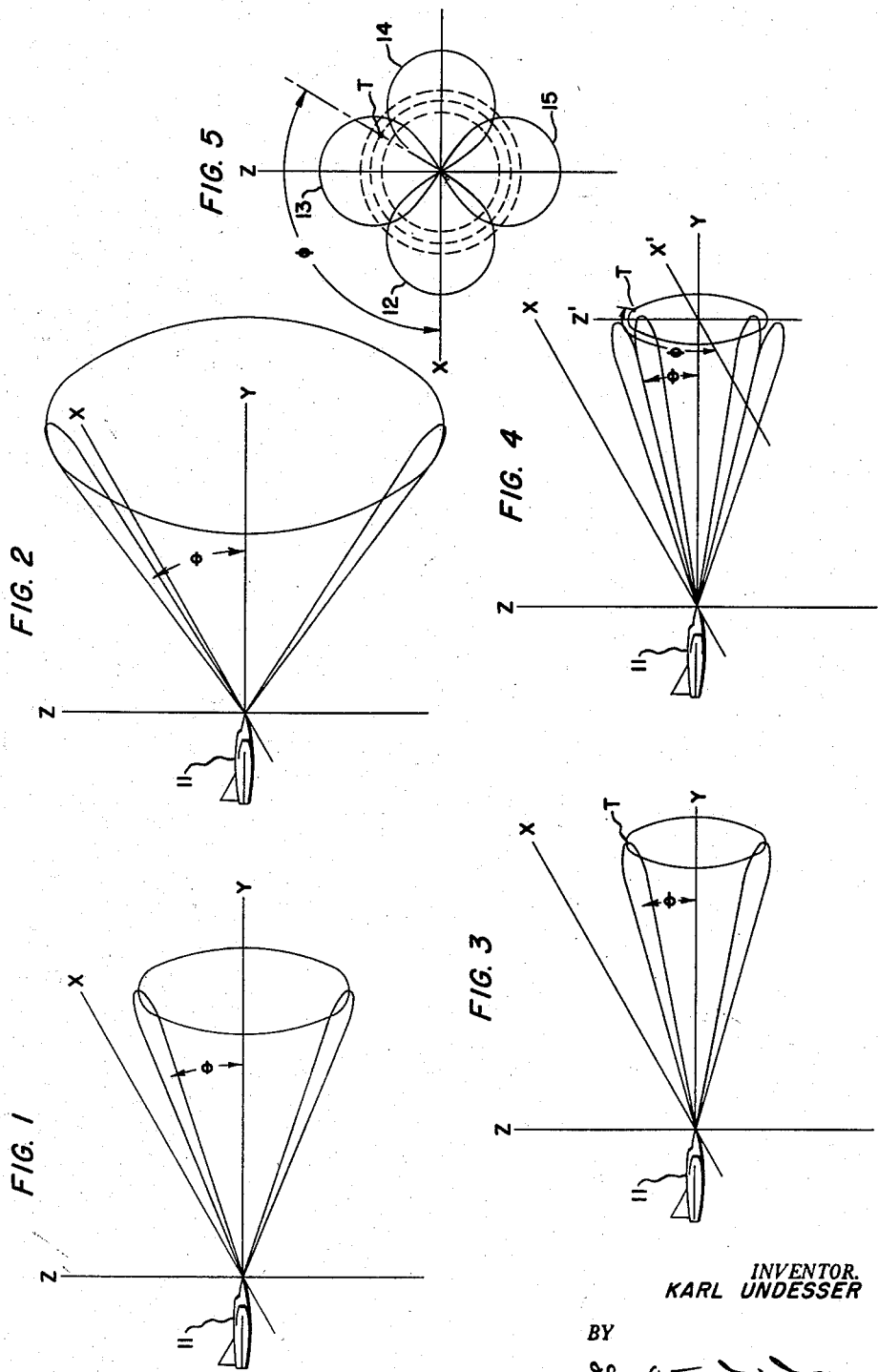

INVENTOR.
KARL UNDESSER
BY
ATTORNEY

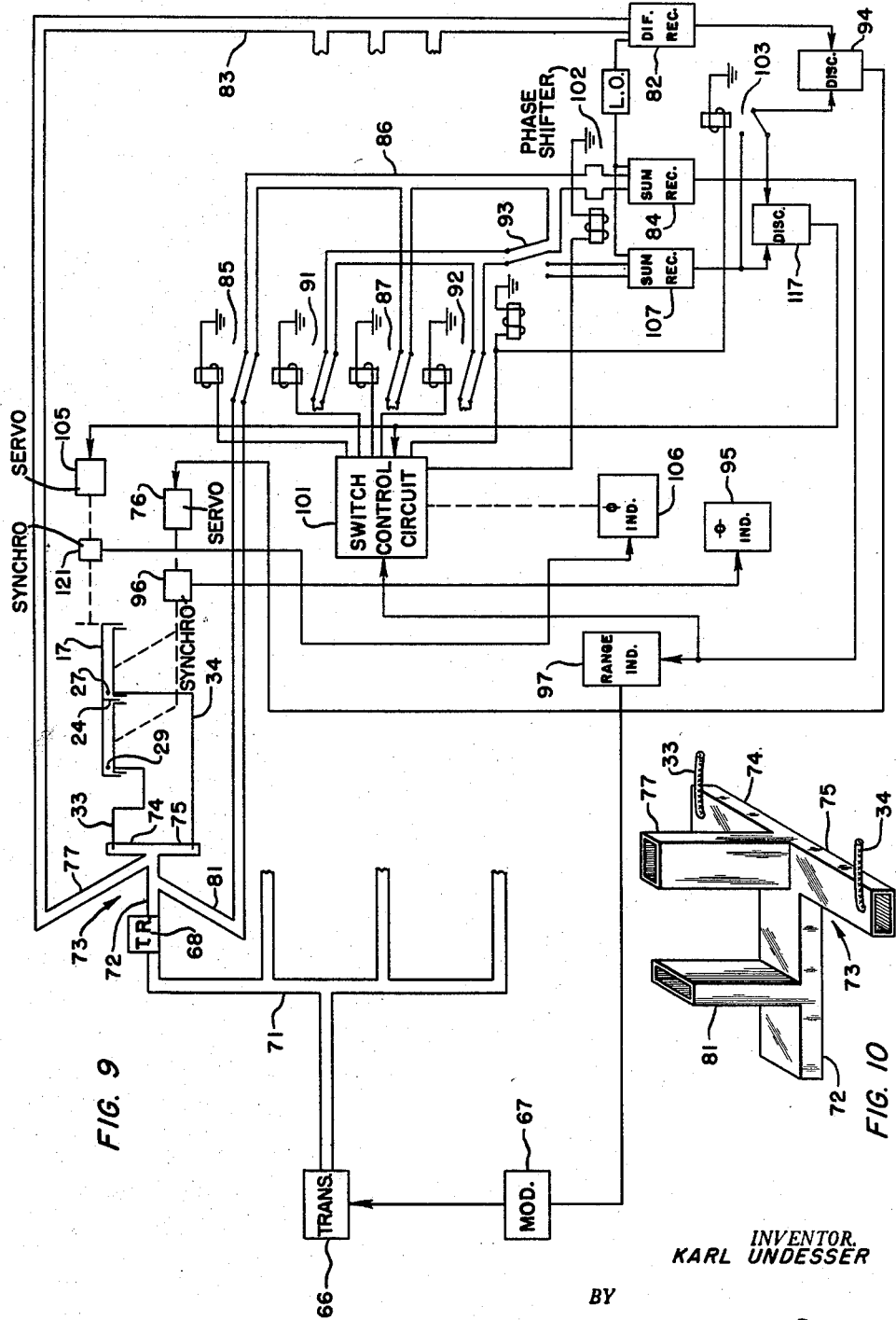

March 1, 1960

K. UNDESSER 2,927,318

RADAR SYSTEM

Filed Dec. 3, 1956

INVENTOR.
KARL UNDESSER

BY

*Walter J. Jenson*

ATTORNEY

United States Patent Office 2,927,318
Patented Mar. 1, 1960

2,927,318
RADAR SYSTEM

Karl Undesser, San Diego, Calif., assignor to General Dynamics Corporation, San Diego, Calif., a corporation of Delaware Application December 3, 1956, Serial No. 626,801

16 Claims. (Cl. 343—16)

This invention relates to radar systems, and more particularly to a radar scanning system wherein linear radiators produce a hollow, conically shaped beam with a variable apex angle to perform search and trailing functions.

A great deal of difficulty has been experienced with the installation of presently known radar systems in high speed aircraft. Room must be found within the aerodynamic contours of the aircraft for a bulky parabolic reflector, the necessary gimbals, servo system, motors and gyroscopes to provide a stable, level reference for azimuth and elevation, and servo systems for traversing the parabolic reflector in elevation and azimuth. A radiation transparent radome conforming to the aerodynamic contours of the aircraft, is necessary to cover the parabolic reflector and the control equipment closely associated therewith in known radar systems. As aircraft speeds enter the supersonic range, rain erosion and aerodynamic heating at these speeds, together with the necessity of avoiding excessive radiation refraction errors and shaping to the required aerodynamic contours of the airplane, make the fabrication of radomes increasingly difficult.

The radar system of the present invention eliminates the radome and its attendant problems by employing a novel radiating system which forms part of the aircraft structure. Further, means are provided for a novel scanning system, whereby a hollow conical beam pattern having a variable apex angle is transmitted.

During the search function of the radar apparatus of this invention, the apex angle of a hollow conical pattern is varied from a very narrow, almost tubular beam to a wide angle. Such a scanning made may conveniently be termed a blooming scan. Upon acquisition of a target, the search phase of variation of the apex angle of the conical pattern is halted.

Range of the target is easily determined in the usual manner by measuring the time delay between transmission of a pulse and return of the echo from the target. A rough determination of the angle $\phi$ from the aircraft's longitudinal or roll, axis may also be determined. More accurate measurement of the angle $\phi$ may be obtained by employing a lobed receiving pattern as will be fully disclosed hereinbelow.

Complete determination of the target's position requires measurement of the target's angular position $\theta$ with respect to the lateral or pitch, axis of the aircraft carrying the radar system of this invention. In order to determine the $\phi$ angle of the target, means are provided for receiving a lobed beam rotating about the longitudinal axis until the signal returned from the target is equal in the two segments of the lobed beam. As the relative positions of the aircraft and the target changes, range and the $\theta$ and $\phi$ angles defining the relative positions are measured continuously.

The antenna of the radar system of this invention comprises an array of linear radiators such as ported waveguides arranged on the outer wall of the nose cone of the aircraft. Such a cone shaped array of waveguides may readily be incorporated in the nose or tail of an aircraft without interference with the aerodynamic contours thereof. A plastic radome is not required, since the linear radiators may be placed flush with the surface of the aircraft skin. Radiating openings in the system are small, and may be closed to conform to the aerodynamic contours with such materials transparent to electromagnetic radiation as quartz, thereby avoiding heat and rain erosion problems associated with large plastic radomes.

It is, therefore, an object of this invention to provide a radar system not requiring a parabolic antenna.

Another object of this invention is to provide a radar system having a blooming scan.

Another object of this invention is to provide an improved method for radar scanning.

Another object of this invention is to provide a method for generating a blooming scan.

Another object of this invention is to provide a flush mounted airborne radar antenna.

Another object of this invention is to provide a radar antenna comprising a cone shaped array of linear radiators.

Another object of this invention is to provide a radar system for installation in high speed aircraft.

Another object of this invention is to provide a radar antenna array comprising a plurality of waveguides arranged in a conical manner.

Another object of this invention is to provide a transmitting antenna having a hollow, single lobe conically shaped beam pattern and a receiving antenna having a hollow dual lobe conically shaped beam pattern.

Another object of this invention is to provide a radar antenna array for receiving a double lobed, hollow conical pattern and a rotating double lobed pattern.

Other objects and advantages of this invention will be more fully understood from a careful consideration of the following detailed description when taken with the accompanying drawings wherein:

Figures 1, 2 and 3 illustrate the hollow cone scanning radiation pattern of the radar system of this invention during the search phase of operation;

Figure 4 illustrates the double lobe wall hollow cone radiation pattern of the radar system of this invention for accurately tracking a target with respect to the longitudinal axis of the antenna array;

Figure 5 illustrates the radiation pattern for accurately tracking a target with respect to the lateral axis of the antenna array;

Figure 9 is a schematic diagram of an embodiment of this invention;

Figure 10 illustrates a waveguide hybrid junction which may be employed in connection with this invention.

Figure 6:
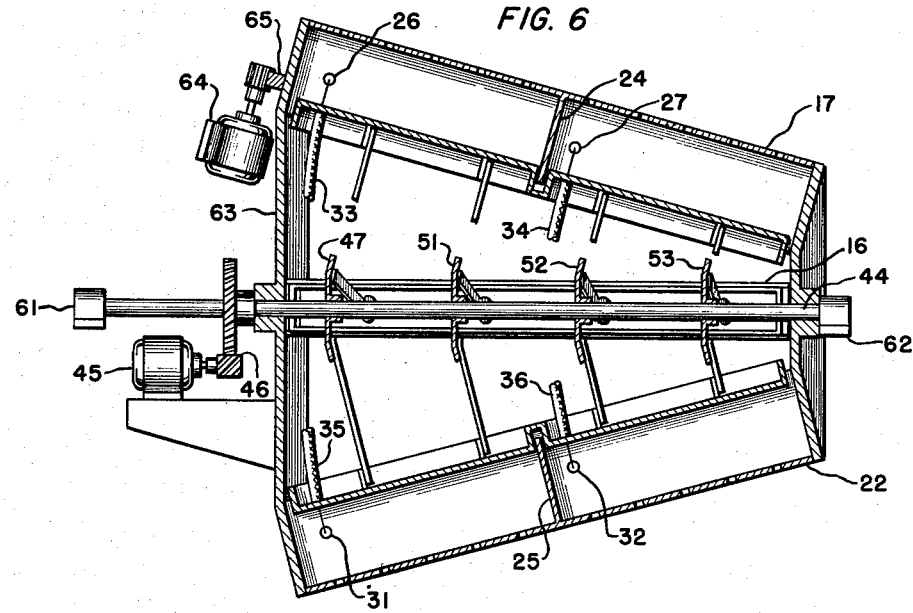
Figure 6 illustrates an embodiment of the linear antenna array.

The transmitting and receiving radiation pattern of the radar system of this invention takes the form of a hollow cone having the apex thereof at the antenna. As illustrated in Figure 1, a set of spatial coordinate axes $x$, $y$ and $z$ have a common origin at the nose of an aircraft 11. The $y$ axis is an extension of the center of the antenna array, and therefore is substantially equivalent to the roll axis of the aircraft. The $x$ axis passes horizontally through the tip of the aircraft's nose at right angles to the $y$ axis, and is substantially parallel to the pitch axis of the aircraft. The vertical or $z$ axis is perpendicular to the x and y axes and is substantially parallel to the yaw axis of the aircraft.

As disclosed hereinabove, the origin of the mutually perpendicular x, y and z axes is conveniently placed at the nose of the aircraft carrying the radar system of this invention. A hollow conical radiation pattern is transmitted with the axis of the cone coincident with the y axis, and with the apex of the cone at the of origin of the coordinate system. By means to be more fully disclosed hereinbelow, the transmitted and received radiation is substantially confined to a narrow pattern about the wall of the cone during the search phase of operation of the radar system of this invention. In order to scan the hemisphere of space forward of the aircraft, the apex angle $2\theta$ of the cone is increased from substantially zero degrees to an angle which may be as large as 180 degrees, decreased to zero, and again increased, the apex angle of the cone pattern thus varying in the periodic fashion conveniently termed blooming scan. Figure 1 illustrates the scanning pattern at a time when the angle $2\theta$ is small, and Figure 2 illustrates the scanning pattern when the angle $2\theta$ is large.

As the apex angle of the conical pattern varies, varying the pattern from a narrow beam aimed parallel to the y axis when $2\theta$ is zero to an omnidirectional sheet in the x, z plane when $2\theta$ is at 180 degrees, a reflected signal from a target T may be received, as illustrated in Figure 3. Upon acquisition of a target, the range R from aircraft 11 to the target T may be readily and accurately determined by measuring the time required for a transmitted pulse to be reflected from the target and return to the aircraft. In addition, the angle $\theta$ of the target with respect to the y axis may be roughly determined. However, the angle $\theta$ may be more accurately measured by providing a lobed receiving pattern for the pulse reflected by the target T in the manner illustrated by Figure 3. Thus, the angle $\theta$ may be accurately measured by adjusting the received radiation pattern to the null point at the intersection of the lobes.

Knowledge of the angle $\phi$ between the target position on the wall of the cone and the x, y plane is required to completely determine the position of the target with respect to the aircraft 11 at the origin of the coordinate system. Referring to Figure 5, aircraft 11 is illustrated head-on in the x, z plane, the y axis being coincident with the aircraft and, therefore, not shown. The novel antenna of the radar system of this invention also receives pulses reflected from target T in the lobed, cloverleaf pattern illustrated in Figure 5, in a manner to be more fully disclosed hereinbelow. Means are provided for receiving a pattern including either lobes 12 and 13 simultaneously, lobes 13 and 14 simultaneously, lobes 14 and 15 simultaneously, or lobes 15 and 12 simultaneously. The quadrant in which the target is located is determined by arranging the receiving antenna pattern to receive two adjacent lobes simultaneously, and sequentially select the next adjacent pair of lobes in the manner disclosed hereinbelow. Thus, arbitrarily selecting lobes 12 and 13 as the receiving pattern in the first quadrant, it will be apparent that a target at T will not reflect a signal to the lobe 12, but a signal will be received in lobe 13. Means are provided for automatically switching to the receiving pattern consisting of lobes 13 and 14. In this quadrant, a signal will be reflected from the target to both of lobes 13 and 14, thereby defining the angle $\phi$ as being in the second quadrant. A more accurate determination of the angle $\phi$ is then obtained by rotating the received pattern to the point where the signal received by the antenna is at the null point between lobes 13 and 14. By measuring the angle of rotation of the antenna, an accurate indication of the angle $\phi$ is obtained. In the manner of the monopulse radar system, well-known in the art, the antenna pattern simultaneously includes the double lobed cone for accurate determination of $\theta$ and the lobed pattern for accurate determination of the angle $\phi$. A simultaneous indication is provided of the angle $\theta$ and the angle $\phi$ of the target by suitable indicators.

Since the position of the target T with respect to the aircraft 11 may vary rapidly, means are provided for automatically adjusting the angles defining the antenna pattern to keep the target in the null position. Further, automatic range tracking circuits, well known in the art may be provided. It will be apparent, therefore, that a target located during the search phase is automatically tracked despite maneuvering of the target or of the aircraft carrying the radar system of this invention.

Figure 7:
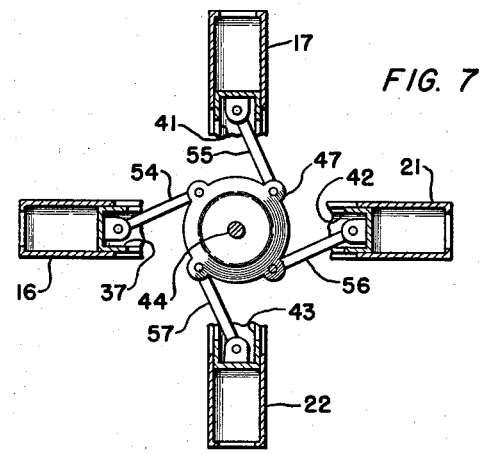
Figure 7 is a cross section taken along 7—7 of Figure 6.
Figure 8:
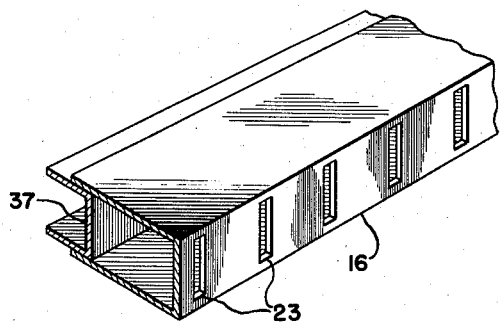
Figure 8 illustrates a ported waveguide type of linear antenna suitable for use in connection with this invention.

The antenna of the radar system of this invention is illustrated by Figures 6, 7 and 8. Four waveguides 16, 17, 21 and 22 are arranged in a pyramidal manner conforming to the areodynamic contours of the nose of an aircraft (not shown). A portion of waveguide 16, exemplary of waveguides 16, 17, 21 and 22, is illustrated in Figure 8. Waveguides 16, 17, 21 and 22 are each furnished with a plurality of radiating apertures 23 across one of the narrow walls of the guide. Exemplarily, apertures 23 may have a length of $0.45\lambda$, a width of $0.1\lambda$, and may be spaced one wavelength from one another, where the wavelength $\lambda$ is the normal wavelength in the waveguide. As is well known to those skilled in the art, such apertures form a radiating array analogous to a stacked dipole array. Each of waveguide radiators 16, 17, 21 and 22 is divided into two sections of equal length by a transverse conductive wall. As illustrated by Figure 6, waveguide radiator 17 is divided into two sections by conductive wall 24 and waveguide radiator 22 is divided by conductive wall 25. The waveguide radiators are an equal number of wavelengths in length. Two exciting antennas are provided in each waveguide radiator for launching a $TE_{0.1}$ wave. Exemplarily, antennas 26 and 27 each launch a $TE_{0.1}$ mode wave in each section of waveguide radiator 17, and antennas 31 and 32 each launch $TE_{0.1}$ mode waves in each section of waveguide radiator 22. Antennas 26, 27, 31 and 32 are connected to coaxial cables 33, 34, 35 and 36 respectively.

In order to vary the wavelength of the radio-frequency signal in the waveguide, and thus the angle of the radiation pattern, the distance between the side of each of the waveguide radiators opposite the radiating apertures and the side containing the radiating apertures may be varied. As is well known in the art, the wavelength of the signal in the waveguide increases as the distance between the front and back walls decrease. The variation in guide wavelength with the variation of waveguide depth as the back wall is moved varies the progressive phase delay of the signals radiated from the apertures. The angle with respect to the radiator of the beam radiated from such a linear array may be varied from zero to ninety degrees, depending upon the relative progressive phase difference between the radiating elements. A linear array radiating a beam parallel to the linear array is known to the art as an "end-fire" array, while such an array radiating a beam at right angles thereto is known as a "broadside" array. Each linear radiator of the radar system of this invention may be continuously varied from the "end-fire" extreme to the "broadside" extreme by varying the waveguide wavelength through suitable means such as the hereinabove disclosed movable back wall.

As illustrated in Figures 6, 7 and 8, waveguide radiators 16, 17, 21 and 22 are equipped with movable back walls 37, 41, 42 and 43 respectively. Shaft 44, rotatably mounted in bearings 61 and 62 fixed to the frame of the aircraft is rotated by servo motor 45 through worm gear train 46. Both sections of each of back walls 37, 41, 42 and 43 are actuated simultaneously and equally through cranks 47, 51, 52 and 53 and connecting rods, such as connecting rods 54, 55, 56 and 57, illustrated in Figure 7.

All of the linear radiators are fixedly attached to a frame 63 journalled for rotation on shaft 44 independently of the rotation of shaft 44. A motor 64, fixed to the frame of the aircraft, rotates the entire radiating assembly through rack and pinion gears 65.

A schematic diagram of the radar system of this invention is illustrated by Figure 9. A pulsed microwave transmitter 66 is modulated by a timing and modulating pulse generator 67. The pulsed radio-frequency power generated by transmitter 66 is split into four equal portions by a suitable waveguide junction 71 having one power input arm and four power output arms, each feeding one radiating waveguide through an individual T—R switch 68 and an individual magic-T junction illustrated by Figure 10. Inasmuch as the arrangement is identical for each radiator, only the system associated with radiator 17 is illustrated.

A quarter of the microwave power generated by transmitter 66 is applied to arm 72 of magic-T 73 by power divider 71. As is well known to those skilled in the art, power applied to a magic-T in this manner divides equally and in phase, half going into arm 74 and half into arm 75. Coaxial cable 33, connected to arm 74, applies the power from arm 74 to antenna 26, while coaxial cable 34 applies the power from arm 75 to antenna 27 in phase with the power applied to antenna 26. Antennas 26 and 27 launch $TE_{0.1}$ mode R.-F. energy down linear radiator 17. As disclosed hereinabove, apertures 23 radiate the R.-F. energy at an angle determined by the relative phase difference of the R.-F. energy exciting the radiating apertures, which is in turn controlled by the position of back wall 41 of the waveguide.

Pulses of R.-F. energy are radiated from apertures 23 at varying angles as servo motor 45 varies the position of waveguide back 41. Servo motor 45 is controlled by a suitable servo circuit 76, of a type well known to the art, adapted to provide a rocking motion to shaft 44, thereby sweeping the angle of radiation from substantially zero to substantially 90 degrees due to the varying position of the back of the waveguide in response to the motion of shaft 44.

As the transmitted hollow conical beam sweeps through a volume of space, a target-T may be illuminated. The target reflects a portion of the transmitted signal back to the antenna assembly and is received by linear radiators 16, 17, 21 and 22. Radiator 17, exemplarily of radiators 16, 17, 21 and 22, comprises two sections, each having a $TE_{0.1}$ waveguide antenna as disclosed hereinabove. Waveguide antenna 26, in the rear section of radiator 17 is connected to arm 74 of magic-T 73 by means of coaxial cable 33 and waveguide antenna 27, in the forward section of radiator 17, is connected to arm 75 of magic-T 73 by means of coaxial cable 34. Magic-T 73 is furnished with arm 77, perpendicular to arms 74, 75 and 72, placed at the intersection of arms 74 and 75, and arm 72. Arm 81, at right angles to arm 72, is also mounted on magic-T 73. As is well known to the art, arm 77 carries an R.-F. signal only when either or both of arms 74 and 75 are excited, the signal carried by arm 77 being equal to the difference between the signals in arms 74 and 75. Arm 81 carries a signal equal to the sum of the signals in arms 74 and 75. Thus, since arm 74 is connected to the rear section of linear radiator 17 and arm 75 is connected to the forward section of radiator 17, a signal equal to the difference between the signals received by the sections of radiator 17 is present in arm 77. The resultant antenna pattern for received signals illustrated by Figure 4, is a double-walled conical pattern having a null circle at the junction of the walls in a manner analogous to the received signal pattern of known monopulse radar systems. If the signal-reflecting target is not on the null circle, an R.-F. signal having an amplitude and phase dependent upon the relative position appears in difference arm 77 of magic-T 73. The difference signal from magic-T 73 is applied to difference signal receiver 82 through waveguide 83.

In order to complete the conical pattern, each of linear radiators 16, 21 and 22 are also connected to transmitter 66 and to a magic-T (not shown) in a manner identical to that disclosed hereinabove in connection with linear radiator 17. Similarly, the difference signals between the two sections of linear radiators 16, 21 and 22 are obtained by the magic-T junction (not shown) associated with each linear radiator. These difference signals are also applied to difference receiver 82.

In order to determine whether angle $\theta$ must be increased or decreased to null the target echo, the sum of the signals received by the two halves of each of the linear radiators must also be obtained. The sum of the signals received by the two sections of a linear radiator, exemplarily linear radiator 17, may be obtained from arm 81 of magic-T 73. As is well known to the art, the sum of signals applied to arms 74 and 75 of magic-T 73 may be obtained from arm 81, placed at right angles to arm 72. The signal equal to the sum of the signals received by the two sections of radiator 17 is applied to a first sum receiver 84 through normally closed electrically controlled waveguide 86. The sum signal from the two sections of linear radiator 22, not shown in Figure 9, is obtained in a like manner and applied to sum receiver 84 through waveguide switch 87 and waveguide 86. Sum signals from linear radiators 16 and 21 are similarly applied to sum receiver 84 through normally closed waveguide switches 91 and 92, and double throw waveguide switch 93 normally in the position illustrated. Waveguide switches 85, 91, 87, 92 and 93 may be of the type described in an article by W. L. Teeter entitled, "A High-Speed Broadband Microwave Waveguide Switch," appearing on pages 11–14 of "IRE Transactions on Microwave Theory and Techniques," volume MTT–3; October, 1955.

Output signals from sum receiver 84 and difference receiver 82 are applied to discriminator 94. A direct voltage representative of error of angle $\theta$ and proportional to the error in polarity and magnitude is furnished by discriminator 94 to servo 76, rotating motor 45, and thereby adjusting the backs 37, 41, 42 and 43 of linear radiators 16, 17, 21 and 22 in the direction reducing the error voltage from discriminator 94 to zero. The angle $\theta$ of the target with respect to the y axis is indicated by indicator 95. Since the angle $\theta$ is determined by the position of the back walls of the linear radiators, which are in turn controlled by the position of shaft 44, a synchro transmitter 96 attached to shaft 44 transmits an indication of the shaft position to a suitable synchro receiver in $\theta$ indicator 95, which may, therefore, be placed for convenient reference, such as in the cockpit of the aircraft. Range may be measured in the usual manner by providing a range indicator 97 well known to the art, connected to sum receiver 84 and modulator 67. Range indicator 97 may also be placed in the cockpit of aircraft 11.

Figure 11:
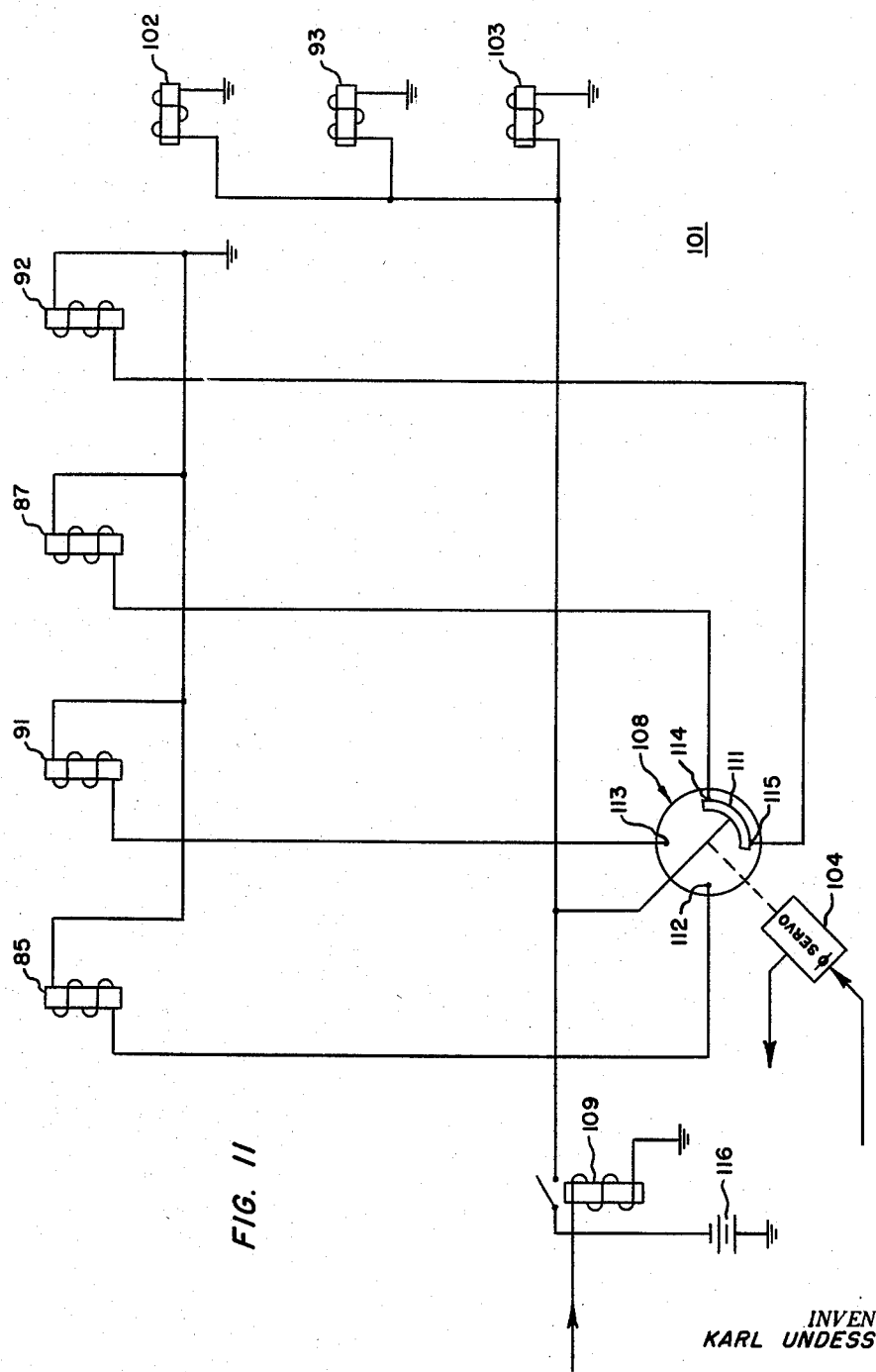
Figure 11 is a schematic diagram of the control circuit employed in Figure 9.

For complete determination of the position of target-T with respect to aircraft 11, it is necessary to determine the angle $\phi$ of the target-T with respect to a known reference. Angle $\phi$ may conveniently be determined with reference to the x axis, as illustrated by Figures 4 and 5. In order to determine the angle $\phi$, use is made of the sum signal channels from linear radiators 16, 17, 21 and 22 and their associated magic-T junctions, such as the signal from arm 81 of magic-T 81 in connection with the switching control circuit 101, illustrated by Figure 11. Switching control circuit 101 controls the position of waveguide switches 85, 91, 87, 92 and 93, a waveguide phase shifter 102, relay 103, $\phi$ quadrant servo 104, $\phi$ tracking servo 105, including $\phi$ tracking motor 64, and $\phi$ indicator 106.

Referring to Figure 5, it will be seen that a receiving pattern having four pairs of lobes is provided for determination of the angular position of the target-T on the circumference of the cone pattern. A signal received by sum receiver 84 is applied to a relay 109, which in turn actuates 180 degrees waveguide phase shifter 102, two position waveguide switch 93, discriminator switching relay 103, and those of waveguide switches 85, 91, 87 and 92 selected by rotary switch 108, actuated by $\phi$ servo 104. Actuation of waveguide switch 93 connects the sum channels of linear radiators 21 and 16 through waveguide switches 91 and 92 to a second sum receiver 107. Similarly, actuation of relay 103 transfers one input of discriminator 94 from the output of sum receiver 84 to the output of sum receiver 107.

One of the double lobed receiving patterns of Figure 5 is set up by actuating the waveguide switches connecting the sum channels of two adjacent linear radiators to sum receiver 84 through phase shifter 102, and to sum receiver 107. Exemplarily, lobes 12 and 13 are obtained by actuating waveguide switches 91 and 87, thereby opening the waveguide circuit in the sum channels from linear radiators 21 and 22. Waveguide switches 91 and 87 are opened when wiper 111 of rotary switch 108 connects battery 116 to switches 91 and 78 through closed relay 105 and rotary switch contacts 113 and 114. Phase shifter 102 provides a 180 degree phase shift in the sum channel of linear radiator 17, but is not in the sum channel of linear radiator 16. This phase shift enables discriminator 117, connected to the output of sum receivers 84 and 107, to provide an output signal varying in polarity and amplitude proportional to target position to two speed servos 104 and 105. Such two speed servos, which may conveniently be of the type disclosed on pages 372–374 of "Electronic Instruments" by I. A. Greenwood, Jr., J. V. Holdam, Jr., and D. MacRae, Jr. published in 1948 by McGraw-Hill Book Company, Inc., New York, have a coarse channel. When employed in connection with the present invention, the coarse channel 104 controls rotary switch 108 to obtain a quadrant indication, while fine channel 105 precisely determines the angle $\phi$ by rotating the linear radiator assembly illustrated by Figures 6 and 7. Therefore, since the coarse servo channel 104 cannot balance the output signal from discriminator 117 with switches 81 and 97, actuated and opened, wiper 111 of rotary switch 108 is moved to apply current from battery 116 to waveguide switches 87 and 92 through rotary switch contacts 114 and 115, thereby opening waveguide switches 87 and 92 and allowing waveguide switches 85 and 91 to remain closed. Lobes 13 and 14, illustrated in Figure 5, are thus set up. An unbalanced signal proportional to the amplitude and direction of unbalance is then applied to fine $\phi$ servo-channel 105, actuating motor 64, which revolves the linear radiator assembly in such a manner as to null the output of discriminator 117 by placing lobes 13 and 14 at an equal signal position with respect to target-T. An indication of the angle $\phi$ is displayed by $\phi$ indicator 106 conveniently placed for the operator in the cockpit of the aircraft. A synchro transmitter 121 transmits an indication of $\phi$ to indication 106, and a connection to coarse $\phi$ servo 104 provide a quadrant indication to $\phi$ indicator 106.

Although a radar system employing four ported waveguide linear radiators has been disclosed hereinabove, other forms of linear radiators are contemplated for use in connection with this invention, such as the linear array antennas disclosed in chapter 9 of "Microwave Antenna Theory and Design" by S. Silver, published in 1949 by McGraw-Hill Book Company, Inc., New York, or, alternatively, a continuous longitudinal slot in the narrow wall of the waveguide may be employed. Other linear radiators capable of variation of the direction of the radiated signal may be used. Further, means other than the movable back wall disclosed may be employed for varying the guide wavelength, such as ferrites, or a movable dielectric, as is well known to the art. Although only four linear radiators are disclosed, additional linear radiators may be employed for more accurate determination of the angle $\phi$. Sufficient numbers of linear radiators may be employed to eliminate the need for rotating the antenna assembly and for the fine $\phi$ scan servo. Moreover, although this invention is presently embodied as a monopulse radar system having a fixed transmitter frequency, it is contemplated that this invention may be employed in connection with a frequency modulated radar, eliminating the necessity for additional equipment for varying the guide wavelength. It is also contemplated that other display means may be employed, or the indications of range, $\theta$ and $\phi$ may be applied to a suitable servo system for automatic control of the aircraft in a manner well known to those skilled in the art.

A radar system has been disclosed hereinabove wherein a conical or cylindrical array of linear radiators transmits a pulse signal in a hollow conical pattern. The apex angle of the cone is cyclically varied by varying the wavelength of the transmitted signal in the radiating waveguide by moving the back wall of the waveguide radiator. A double lobed conical wall receiving pattern is obtained by taking the difference between the signals received by front and rear halves of the waveguide radiators by means of a magic-T. Upon acquisition of a target, the back walls of the radiators are adjusted to bring the conical double lobe wall receiving pattern to an equal signal position by means of a discriminator and servo system connected to the receiving system, thereby determining the cone angle of the target. Range between the radar system and the target is determined in the usual way by measuring the time delay between transmitted and received pulses. Complete determination of target position is obtained by also providing a lobed receiving pattern and adjusting the lobe position to provide equal returns to both lobes. The lobed pattern is obtained by automatically introducing a 180 degree phase shift in a sum channel from one radiator and comparing the phase shifted signal with the signal received directly at an adjacent radiator by means of a discriminator and employing a two speed servo to adjust the lobes to a null position.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A radar system including a radio-frequency oscillator, a plurality of transmission line radiators connected to said oscillator for radiating a hollow conical field pattern, means associated with said transmission line radiators for varying the apex angle of said conical field pattern, a receiver connected to said plurality of transmission line radiators for detecting a signal reflected by a target, and an indicator responsive to said receiver for indicating the relative position of said target.

2. A radar system including a radio-frequency oscillator, a plurality of transmission line radiators disposed about the periphery of a cone for radiating a hollow conical field pattern, means associated with said transmission line radiators for varying the apex angle of said conical field pattern, a receiver for detecting a signal reflected by a target, means for connecting said oscillator and said receiver to said plurality of transmission line radiators, and an indicator responsive to said receiver for indicating the relative position of said target.

3. A radar system including a radio-frequency oscillator, a plurality of transmission line radiators disposed about the periphery of a cone for radiating a hollow conical field pattern, said transmission line radiators having a first section and a second section, means associated with said transmission line radiators for varying the apex angle of said conical field pattern, a receiver for detecting a signal reflected by a target, means for connecting said oscillator and said receiver to said plurality of transmission line radiators, and an indicator responsive to said receiver for indicating the relative position of said target.

4. A radar system including a radio-frequency oscillator, a plurality of transmission line radiators disposed about the periphery of a cone for radiating a hollow conical field pattern, said transmission line radiators having a first section and a second section, means associated with said transmission line radiators for varying the apex angle of said conical field pattern, a receiver for detecting a signal reflected by a target, means for connecting said oscillator and said receiver to said plurality of transmission line radiators, said means including a power divider for supplying radio-frequency energy from said oscillator to each of said transmission line radiators, and an indicator responsive to said receiver for indicating the relative position of said target.

5. A radar system including a radio-frequency oscillator, a plurality of transmission line radiators disposed about the periphery of a cone for radiating a hollow conical field pattern, said transmission line radiators having a first section and a second section, means for modifying the phase velocity of said transmission line radiators for varying the apex angle of said conical field pattern, a receiver for detecting a signal reflected by a target, means for connecting said oscillator and said receiver to said plurality of transmission line radiators, said means including a power divider for supplying radio-frequency energy from said oscillator to each of said transmission line radiators, and an indicator responsive to said receiver for indicating the relative position of said target.

6. A radar system including a radio-frequency oscillator, a plurality of transmission line radiators disposed about the periphery of a cone for radiating a hollow conical field pattern, said transmission line radiators having a first section and a second section, means for modifying the phase velocity of said transmission line radiators for varying the apex angle of said conical field pattern, a first receiver for detecting the sum of signals reflected by a target and received by said first and second sections of said radiators, a second receiver for detecting the difference between the signals reflected by said target and received by said first and second sections of said radiators, thereby defining a double wall conical receiving pattern, a power divider for connecting said oscillator to said plurality of transmission line radiators, hybrid junction connecting said receivers to said first and second sections of said transmission line radiators for obtaining said sum and difference signals, and indicator means responsive to said receivers for indicating the relative position of said target.

7. A radar system including a radio-frequency oscillator, a plurality of transmission line radiators disposed about the periphery of a cone for radiating a hollow conical field pattern, said transmission line radiators having a first section and a second section, means for modifying the phase velocity of said transmission line radiators for varying the apex angle of said conical field pattern, a first receiver for detecting the sum of signals reflected by a target and received by said first and second sections of said radiators, a second receiver for detecting the difference between the signals reflected by said target and received by said first and second sections of said radiators thereby defining a double wall conical receiving pattern, a power divider for connecting said oscillator to said plurality of transmission line radiators, a hybrid junction connecting said receivers to said first and second sections of said transmission line radiators for obtaining said sum and difference signals, and an indicator responsive to said means for indicating the apex angle of said target.

8. A radar system including a pulsed radio-frequency oscillator, a pulse modulator connected to said oscillator, a plurality of transmission line radiators disposed about the periphery of a cone for radiating a hollow conical field pattern, said transmission line radiators having a first section and a second section, means for modifying the phase velocity of said transmission line radiators for varying the apex angle of said conical field pattern, a first receiver for detecting the sum of signals reflected by a target and received by said first and second sections of said radiators, a second receiver for detecting the difference between the signals reflected by said target and received by said first and second sections of said radiators thereby defining a double wall conical receiving pattern, a power divider for connecting said oscillator to said plurality of transmission line radiators, a hybrid junction connecting said receivers to said first and second sections of said transmission line radiators for obtaining said sum and difference signals, a first indicator responsive to said first receiver and said pulse modulator for indicating the range of said target and a second indicator responsive to said means for indicating the apex angle of said target.

9. A radar system including a pulsed radio-frequency oscillator, a pulse modulator connected to said oscillator, a plurality of transmission line radiators disposed about the periphery of a cone for radiating a hollow conical field pattern, said transmission line radiators having a first section and a second section, means for modifying the phase velocity of said transmission line radiators for varying the apex angle of said conical field pattern, a first receiver for detecting the sum of signals reflected by a target and received by said first and second sections of said radiators, a second receiver for detecting the difference between the signals reflected by said target and received by said first and second sections of said radiators, thereby defining a double wall conical receiving pattern, a power divider for connecting said oscillator to said plurality of transmission line radiators, a hybrid junction connecting said receivers to said first and second sections of said transmission line radiators for obtaining said sum and difference signals, means associated with said plurality of transmission line radiators for determining the radial angle of said target, a first indicator responsive to said first receiver and said pulse modulator for indicating the range of said target and a second indicator responsive to said means for modifying the phase velocity for indicating the apex angle of said target.

10. A radar system including a pulsed radio-frequency oscillator, a pulse modulator connected to said oscillator, a plurality of linear radiators longitudinally disposed about the periphery of a cone for radiating a hollow conical field pattern, each of said linear radiators having a first section and a second section, a wave length modifier associated with said linear radiators for varying the apex angle of said conical field pattern, a first receiver for detecting the sum of signals reflected by a target and received by said first and second sections of said radiators, a second receiver for detecting the difference between the signals reflected by said target and received by said first and second sections of said radiators, thereby defining a double wall conical receiving pattern, a third receiver for detecting the sum of signals reflected by said target and received by said first and second sections of said radiators, a phase shifter associated with said third receiver, a power divider for connecting said oscillator to said plurality of linear radiators, a hybrid junction connecting said receivers to said first and second sections of said linear radiators for obtaining said sum and difference signals, a first indicator responsive to said first receiver and said pulse modulator for indicating the range of said target, a second indicator responsive to said wavelength modifier for indicating the apex angle of said target, and a third indicator responsive to said first and third receivers for indicating the radial angle of said target.

11. A radar system including a pulsed radio-frequency oscillator, a pulse modulator connected to said oscillator, a plurality of linear radiators longitudinally disposed about the periphery of a cone for radiating a hollow conical field pattern, each of said linear radiators having a first section and a second section, a wavelength modifier associated with said linear radiators for varying the apex angle of said conical field pattern, a first receiver for detecting the sum of signals reflected by a target and received by said first and second sections of said radiators, a second receiver for detecting the difference between the signals reflected by said target and received by said first and second sections of said radiators, thereby defining a double wall conical receiving pattern, a third receiver for detecting the sum of signals reflected by said target and received by said first and second sections of said radiators, a phase shifter associated with said third receiver, a power divider for connecting said oscillator to said plurality of linear radiators, a hybrid junction connecting said receivers to said first and second sections of said linear radiators for obtaining said sum and difference signals, switching means associated with said hybrid junction for selectively connecting an adjacent pair of said radiators to said first and third receivers respectively, a first indicator responsive to said first receiver and said pulse modulator for indicating the range of said target, a second indicator responsive to said wavelength modifier for indicating the apex angle of said target, and a third indicator responsive to said first and third receivers for indicating the radial angle of said target.

12. A radar system including a pulsed radio-frequency oscillator, a pulse modulator connected to said oscillator, a plurality of linear radiators longitudinally disposed about the periphery of a cone for radiating a hollow conical field pattern, each of said linear radiators having a first section and a second section, a wavelength modifier associated with said linear radiators for varying the apex angle of said conical field pattern, a first receiver for detecting the sum of signals reflected by a target and received by said first and second sections of said radiators, a second receiver for detecting the difference between the signals reflected by said target and received by said first and second sections of said radiators, thereby defining a double wall conical receiving pattern, a third receiver for detecting the sum of signals reflected by said target and received by said first and second sections of said radiators, a phase shifter associated with said third receiver, a power divider for connecting said oscillator to said plurality of linear radiators, a hybrid junction connecting said receivers to said first and second sections of said linear radiators for obtaining said sum and difference signals, switching means associated with said hybrid junction for selectively connecting an adjacent pair of said radiators to said first and third receivers respectively, a first discriminator connected to said first and third receivers, a second discriminator connected to said second receiver, a first indicator responsive to said first receiver and said pulse modulator for indicating the range of said target, a second indicator responsive to said second discriminator and wavelength modifier for indicating the apex angle of said target, and a third indicator responsive to said first discriminator for indicating the radial angle of said target.

13. A radar system including a radio-frequency oscillator, a plurality of waveguides disposed about the periphery of a cone and connected to said oscillator, radiating apertures in said waveguides for radiating a hollow conical field pattern, means for modifying the phase velocity of said waveguides for varying the apex angle of said conical field pattern, and receiving means connected to said plurality of waveguides for detecting a signal reflected by a target.

14. A radar system including a radio-frequency oscillator, a plurality of waveguides disposed about the periphery of a cone, said waveguides having a first section and a second section, radiating apertures in said waveguides for radiating a hollow conical field pattern, means for modifying the phase velocity of said waveguides for varying the apex angle of said conical field pattern, a hybrid junction associated with each of said waveguides having means for applying energy from said oscillator to said first and second waveguide sections for transmission, a first receiver connected to said hybrid junction for detecting the sum of signals reflected by a target and received by said first and second waveguide sections, and a second receiver connected to said hybrid junction for detecting the difference between signals reflected by said target and received by said first and second waveguide sections.

15. A radar system including a radio-frequency oscillator, a plurality of waveguides disposed about the periphery of a cone, said waveguides having a first section and a second section, radiating apertures in said waveguides for radiating a hollow conical field pattern, means for modifying the phase velocity of said waveguides for varying the apex angle of said conical field pattern, a hybrid junction associated with each of said waveguides having one arm connected to said oscillator for applying energy to said first and second waveguide sections for transmission, a first receiver connected to a second arm of said hybrid junction for detecting the sum of signals reflected by a target and received by said first and second waveguide sections, and a second receiver connected to a third arm of said hybrid junction for detecting the difference between signals reflected by said target and received by said first and second waveguide sections.

16. A radar system including a radio-frequency oscillator, a plurality of waveguides longitudinally disposed about the periphery of a cone, each of said waveguides having a first section and a second section separated by a conductive wall, a plurality of radiating apertures in a first wall of each of said waveguides for radiating a hollow conical field pattern, a movable wall in each of said waveguides opposite said first wall, a means for simultaneously displacing said movable walls for varying the apex angle of said conical field pattern, a hybrid junction associated with each of said waveguides having one arm connected to said oscillator for applying energy to said first and second waveguide sections for transmission, a first receiver connected to a second arm of said hybrid junction for detecting the sum of signals reflected by a target and received by said first and second waveguide sections, and a second receiver connected to a third arm of said hybrid junction for detecting the difference between signals reflected by said target and received by said first and second waveguide sections.

References Cited in the file of this patent

UNITED STATES PATENTS

| | | |
|---|---|---|
| 2,134,126 | Hooven | Oct. 25, 1938 |
| 2,403,728 | Loughron | July 9, 1946 |
| 2,602,893 | Ratliff | July 8, 1952 |

FOREIGN PATENTS

| | | |
|---|---|---|
| 739,618 | Great Britain | Nov. 2, 1955 |